Aug. 6, 1940.    J. A. FLYNN    2,210,450
ELECTRIC STORAGE BATTERY
Filed July 22, 1937
Fig. 1.
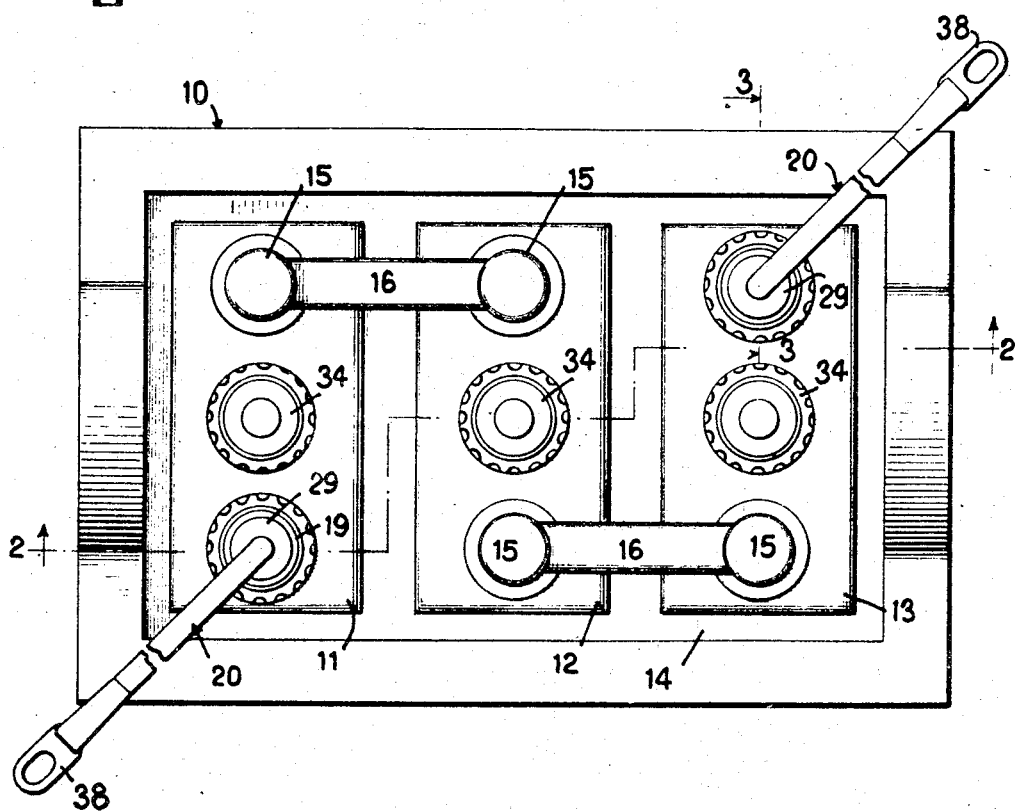
Fig. 2.
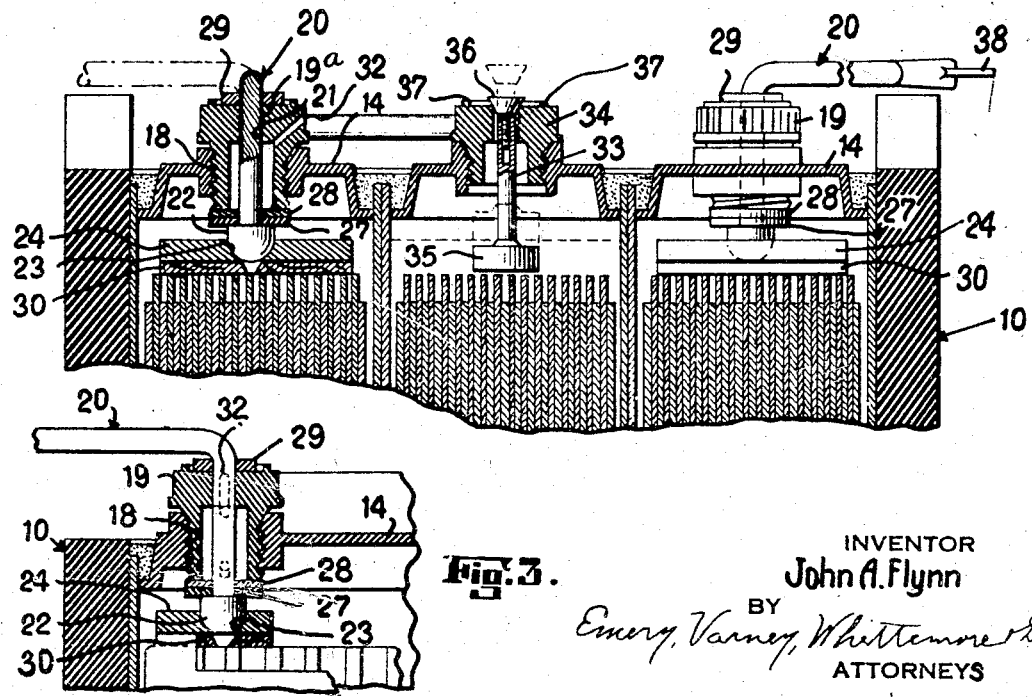
Fig. 3.
INVENTOR
John A. Flynn
BY
Emery, Varney, Whittemore & Dix
ATTORNEYS Patented Aug. 6, 1940

2,210,450

UNITED STATES PATENT OFFICE 2,210,450

ELECTRIC STORAGE BATTERY

John A. Flynn, New York, N. Y.

Application July 22, 1937, Serial No. 155,027

4 Claims. (Cl. 136—135)

This invention relates to electric storage batteries and has for an object the provision of improvements in this art.

One of the features of the invention is the provision of improved terminal connections for a battery which will eliminate corrosion.

Another feature is the provision of terminal connections which may be easily and quickly attached and detached.

Another feature of the invention is the provision of improved terminal connections which will prevent the leakage of electrolytic fluid and in combination therewith of means providing ventilation or breathing of the battery.

Another feature of the invention is the provision of a normally immersed terminal connection and in combination therewith of means for indicating the level of the electrolytic fluid and for giving an alarm or indication when the level of the electrolytic fluid drops below the point at which said terminal connection is immersed.

Another feature of the invention is the provision of a terminal connection which will also provide for filling the battery, provision also being made for washing a part of the terminal connection when the battery is filled.

Another feature of the invention is the provision of means for avoiding short circuits when the interior terminal connection is made.

Other objects and features of novelty will be apparent from the following description of an illustrative embodiment of the invention, reference being made to the accompanying drawing, wherein:

Fig. 1 is a top plan view of a three cell storage battery of the type commonly used on automobiles, embodying the present invention;

Fig. 2 is a vertical section taken on the line line 2—2 of Fig. 1; and

Fig. 3 is a vertical section through one of the terminal connections.

Referring to the drawing, a battery 10 comprises three cells 11, 12 and 13, each cell including the usual sets of positive and negative plates and bus bars at each end of the cells for positive and negative terminal connections respectively. A cover 14 of insulating material is firmly secured to the top of each cell. Between cells electrical connections may be made by posts 15 extending through the cover and exterior bus bars 16; but if desired terminal connections of the type hereinafter to be described may be used between cells. If the usual construction is employed, a filling opening and cap therefor may be provided for the middle cell, the outer cells being filled by means provided hereby and not requiring a special filling opening. Herein another cap serves for filling the middle cell.

The cover at each corner is provided with screw threaded openings 18, the length of the openings being increased for strength, if the cover is not thick enough, by interior and exterior lips.

A cap 19 is externally threaded so as to be secured in the opening 18. For material like hard rubber or the like it has been found that six threads per inch is satisfactory.

The cap 19 is provided with a central aperture 19a and through this aperture extends a conductor or lead 20 which may consist of a solid or stranded copper core covered exteriorly by a lead sheath 21 to avoid corrosion. The lead sheath will extend along the conductor as far as desired or as far as the zone of corrosion from the battery extends.

At its inner end the conductor or lead is provided with a terminal plug 22 adapted to fit tightly in a hole or socket 23 formed in the bus bar 24. The plug 22 may be tapered or rounded so as to wedge in the hole or socket but the wedging action should not be great enough to cause difficulty in removing the plug.

The upper end of the plug is flat and cooperates with a rubber washer 27 and a fiber or hard rubber washer 28 to establish a seal with the flat lower end of the cap. The soft rubber washer insures a seal and a locking connection between the cap and plug and the fiber washer prevents injury to the rubber washer when the cap turns about the conductor.

A flange 29 may be provided exteriorly on the conductor above the top of the cap so as to cause the withdrawal of the plug from its socket when the cap is turned out. Either the flange 29 or the plug 22 may be connected to the conductor after it has been passed through the aperture in the cap. The connection may be made, for example, by soldering. When the plug 22 and the lead 20 have been firmly fastened together or assembled, and then after assembly in the battery the flange 29 is soldered to the lead 20. The reverse operation would be true if flange 29 were soldered to lead 20 before assembly.

In case the bus bar is made of lead, as is usual, and in case the socket or hole 23 is formed in an overhanging portion of the bus bar, an insulating separator 30 of wood or other suitable material is placed between the bus bar and the tops of the plates so that when the plug is forced down neither it nor the bus bar will be moved into contact with the alternately placed plates of opposite charge.

Preferably the socket 23 extends all the way through an overhanging portion of the bus bar and the separator 30 is provided with a mating hole so that the socket will not accumulate stray material which might prevent good contact with the plug and so the socket may be washed by the through passage of liquid when the battery is filled.

As stated above, the rubber washer seals the space about the conductor at the plug so as to prevent the leakage of fluid by creepage up the conductor. This will at the same time prevent breathing or the passage of gas along the conductor although it has a loose fit in the cap. Breathing may take place to some extent along the threads on the cap but if desired a small hole 32 and a lower hole just above the washer 28 (Fig. 2) may be formed in the cap for breathing.

In lieu of or in addition to other breathing means provided, breathing may be permitted by a device like that shown in my Patent No. 2,033,279 granted March 10, 1936. This device as herein illustrated comprises a stem 33 loosely fitting in an aperture which may be formed in a removable cap 34. Breathing is therefore permitted along the stem 33.

A float of sponge rubber or the like 35 is attached to the stem 33 and the upper end of the stem carries a switch closure piece 36 adapted when the float is in a lower position to connect contacts 37 and give an alarm. If desired the piece 35 may be adjustably mounted on he stem to vary the point of alarm by reference to the height of the liquid in the battery. This insures that the terminal connection inside the battery will always be immersed. So long as it is immersed it will not corrode and the plug may be easily inserted or removed.

The outer end of the conductor 20 is of considerable length so as to extend well away from the zone at the battery where acid or fumes might reach the terminal clip 38 of the conductor so the clip will always be clean for easy connection with the external conductors or cables. Preferably, however, the ends of the conductors 20 are short enough to lie entirely or substantially within the lateral limits of the battery when turned around over it so as to avoid obstruction to the insertion or removal of the battery in the space provided for it. This limitation to the length of the conductors 20 need not be rigidly adhered to if other factors require longer lengths since the caps carrying the terminal conductors may be entirely removed from the battery. Indeed, the conductor 20 may be long enough to extend by itself to ground or to the usual points to which battery cables are carried without requiring a cable connection at the clip 38. The cable 20 is preferably flexible.

Since the terminal caps are removable they may be taken out as readily as are the filling caps usually provided when it is desired to introduce liquid into the battery.

It will thus be seen that the invention provides terminal connections which may always be readily and easily disconnected from the battery and in which the external conductors may be readily and easily disconnected from the terminal conductors. This is true because of the fact that all connections are so formed and disposed as to avoid corrosion and the usual difficulties encountered in disconnecting the parts.

The invention also provides a convenient arrangement for adding fluid to the battery without requiring the usual filling openings on the cells employing the present terminals. The danger of interior short circuits is avoided. The terminal is sealed against the outflow of liquid at the conductor but adequate breathing is provided for. Also means are provided for insuring that the interior terminal connection will be properly covered with liquid to avoid corrosion thereat.

The construction is simple and inexpensive and well adapted to serve the uses required of it.

While one embodiment of the invention has been described for purposes of illustration it will be understood that the invention may have various embodiments within the limits of the prior art and the scope of the subjoined claims.

I claim:

1. An electrical storage battery comprising in combination, a conductor passing from the inside to the outside of a battery, a cap rotatably mounted on said conductor and cooperating with the cover of the battery to force the conductor downward, a permanent terminal element inside the battery adapted to cooperate with said conductor, and means for limiting the movement of said terminal element when the conductor is forced against it, said terminal element consisting of a portion of a bus bar overhanging the plates of the battery, and said movement limiting means consisting of an insulating member disposed between said overhanging portion and said plates.

2. An electrical storage battery comprising in combination, a bus bar overhanging the plates of the battery, an insulating member between said overhanging portion and said plates, said overhanging portion and insulating member being provided with aligned apertures extending completely therethrough, a cover for the battery provided with an opening above the apertures in the bus bar and insulating member, a terminal member passing through said opening and removably engaging the bus bar within said opening, and means for forcing said terminal member into the aperture of the bus bar.

3. In an electric storage battery in combination, a cover, an opening therein, a cap threaded in said opening, a conductor loosely passing through said cap, a terminal plug on said conductor, an electrical conducting member for engaging battery plates within said battery and adapted to be separably engaged by said plug, and means for sealing said plug with the lower end of said cap as the plug is brought into positive engagement with said member by downward movement of the cap.

4. In an electric storage battery in combination, a cover, an opening therein, a cap threaded in said opening, a conductor loosely passing through said cap, a terminal plug on said conductor, an electrical conducting member for engaging battery plates within said battery and adapted to be engaged by said plug, and means for sealing said plug with the lower end of said cap as the plug is brought into engagement with said member by downward movement of the cap, said sealing means comprising a soft rubber washer and a harder washer thereabove on said conductor between said plug and the end of said cap.

JOHN A. FLYNN.